United States Patent [19]

Schultshick

[11] Patent Number: 4,552,493

[45] Date of Patent: Nov. 12, 1985

[54] APPARATUS FOR AUTOMATICALLY DISPLACING THE RADIAL POSITION OF A CROSS-FEED SLIDE IN A CROSS-FEED HEAD OF A CUTTING MACHINE

[75] Inventor: Robert Schultshick, Uster, Switzerland

[73] Assignee: Werkzeugmaschinenfabrik Oerlikon-Bührle AG, Zurich, Switzerland

[21] Appl. No.: 488,601

[22] Filed: Apr. 25, 1983

[30] Foreign Application Priority Data

May 3, 1982 [CH] Switzerland ................ 2696/82

[51] Int. Cl.[4] .................. B23B 49/00; B23B 25/06
[52] U.S. Cl. .............................. 408/3; 408/8; 408/13
[58] Field of Search ............ 82/2 E,'2 R, 1.2–1.5, 82/2 B; 408/10, 11, 13, 3, 4, 8; 364/167, 474, 560; 33/181 R; 318/572

[56] References Cited

U.S. PATENT DOCUMENTS

| | | | |
|---|---|---|---|
| 3,124,976 | 3/1964 | Pittwood | 408/8 |
| 3,492,894 | 2/1970 | Hahn et al. | 408/13 |
| 3,845,532 | 11/1974 | Smith . | |
| 3,884,590 | 5/1975 | Skrentner et al. | 408/13 |
| 4,029,427 | 6/1977 | Cloup | 408/3 |
| 4,033,206 | 7/1977 | Morita et al. . | |
| 4,055,386 | 10/1977 | Chynoweth et al. | 408/13 |
| 4,204,782 | 5/1980 | Spits | 408/3 |
| 4,250,775 | 2/1981 | Jerus et al. . | |
| 4,400,118 | 8/1983 | Yamakage et al. | 408/12 |
| 4,416,569 | 11/1983 | Yamakage et al. | 408/147 |
| 4,440,530 | 4/1984 | Yamakage | 82/2 B |

FOREIGN PATENT DOCUMENTS

| | | | |
|---|---|---|---|
| 2804011 | 8/1979 | Fed. Rep. of Germany . | |
| 15655 | 1/1982 | Japan | 408/4 |

*Primary Examiner*—Leonidas Vlachos
*Assistant Examiner*—Jerry Kearns
*Attorney, Agent, or Firm*—Werner W. Kleeman

[57] ABSTRACT

In the apparatus a cross-feed head is supported at a rotatable spindle. A cross-feed slide of the cross-feed head is arranged to be displaceable by means of a displacement drive and a displacement mechanism in a cross-feed displacement direction. The rotatable spindle is arranged on a carriage for displacement in a carriage displacement direction transversely with respect to the spindle. Furthermore, a numerical control is provided. In order to be able to adjust the radial position of the cross-feed slide with greater precision a sensor or feeler is fixedly arranged together with the displacement drive at one end of the carriage displacement travel path. An adjusting control or device controls the displacement of the cross-feed slide in conjunction with the sensor and with the displacement drive.

12 Claims, 3 Drawing Figures

APPARATUS FOR AUTOMATICALLY DISPLACING THE RADIAL POSITION OF A CROSS-FEED SLIDE IN A CROSS-FEED HEAD OF A CUTTING MACHINE

CROSS-REFERENCE TO RELATED APPLICATION

This application is related to the commonly assigned, copending U.S. application, Ser. No. 06/488,534 filed April 25, 1983, and entitled "Cutter Head of a Cutting Machine".

BACKGROUND OF THE INVENTION

The present invention relates to a new and improved apparatus for automatically displacing or adjusting the radial position of a cross-feed slide of a cross-feed head of a cutting machine containing a rotatable spindle for receiving or accommodating the cross-feed head. The cross-feed slide of the cross-feed head is arranged to be displaceable in a cross-feed direction by means of a displacement or adjustment drive and a displacement or adjustment mechanism. There also are provided a carriage accommodating the spindle and which is displaceable in a carriage displacement direction transversely with respect to the spindle and a numerical control.

An apparatus as described hereinbefore is already known in practice. The cross-feed slide of the cross-feed head is continuously displaceable during the rotation of the spindle. This occurs by means of a displacement drive mounted at a spindle carriage and provided for a displacement mechanism in the cross-feed head. The displacement mechanism comprises differential gearing to which may be inputted a displacement magnitude in the form of a timewise limited rotational speed difference. This rotational speed difference activates the displacement mechanism. The exact radial position of the cross-feed slide is determined by a measuring sensor at the workpiece and is inputted to the numerical control which derives therefrom the displacement magnitude.

When using such apparatus over longer periods of operation, heat is generated in the differential gearing which propagates through the cross-feed head and thus also affects the position of the tool. Errors result therefrom which are impermissible for finish-machining operations. Additionally, any errors in the displacement gearing will also affect the radial position of the tool. With such an apparatus there cannot be properly performed a roughing operation during which high cutting forces occur since the cross-feed slide cannot be clamped in its desired position. The actual radial position assumed by the tool after the displacement of the cross-feed slide is not checked in such apparatus.

SUMMARY OF THE INVENTION

Therefore, with the foregoing in mind it is a primary object of the present invention to provide a new and improved construction of apparatus for automatically displacing the radial position of a cross-feed slide in a cross-feed head of a cutting machine, by means of which a more precise adjustment of the radial position of the cross-feed slide is rendered possible.

Now in order to implement this and still further objects of the invention, which will become more readily apparent as the description proceeds, the apparatus of the present development is manifested by the features that, spindle indexing means are provided for indexing the cross-feed displacement direction of the cross-feed head parallel to the carriage displacement direction. A sensor or feeler is fixedly arranged together with the displacement drive means for the displacement mechanism at one end of the carriage displacement travel path, and an adjusting or adjustment control of the numerical control is connected to the sensor and to the displacement drive means via lines or conductors and coacts with the sensor and the displacement drive means such that in a reference position of the carriage, which is predetermined by the numerical control and which is associated with a desired amount of displacement, the required cross-feed direction of the cross-feed slide is recognized and is initiated as a compensating displacement until the desired amount of displacement is obtained.

Some of the more notable advantages achieved by the invention are essentially that the actual position of the tool, after displacement or adjustment of the cross-feed slide, is checked by contact with a sensor. Due to the specific arrangement of the sensor and the displacement drive means the working space of the cutting machine is not restricted. A tool changer as well as a pallet changer can be employed without hindrance. Also, cross-feed heads having large displacement ranges or paths for the cross-feed slide as well as cross-feed heads containing clamping means for the cross-feed slide can be employed. The adjustment precision achievable for the cross-feed slide also enables performing finish-machining operations. Furthermore, there can be used cross-feed heads containing more than one tool. By suitably programming a programmable control unit the cross-feed slide can be adjusted, firstly, with respect to one of the tools which, for example, may be a roughing tool, and subsequently with respect to another tool also mounted thereat which, for example, may be a finishing tool.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
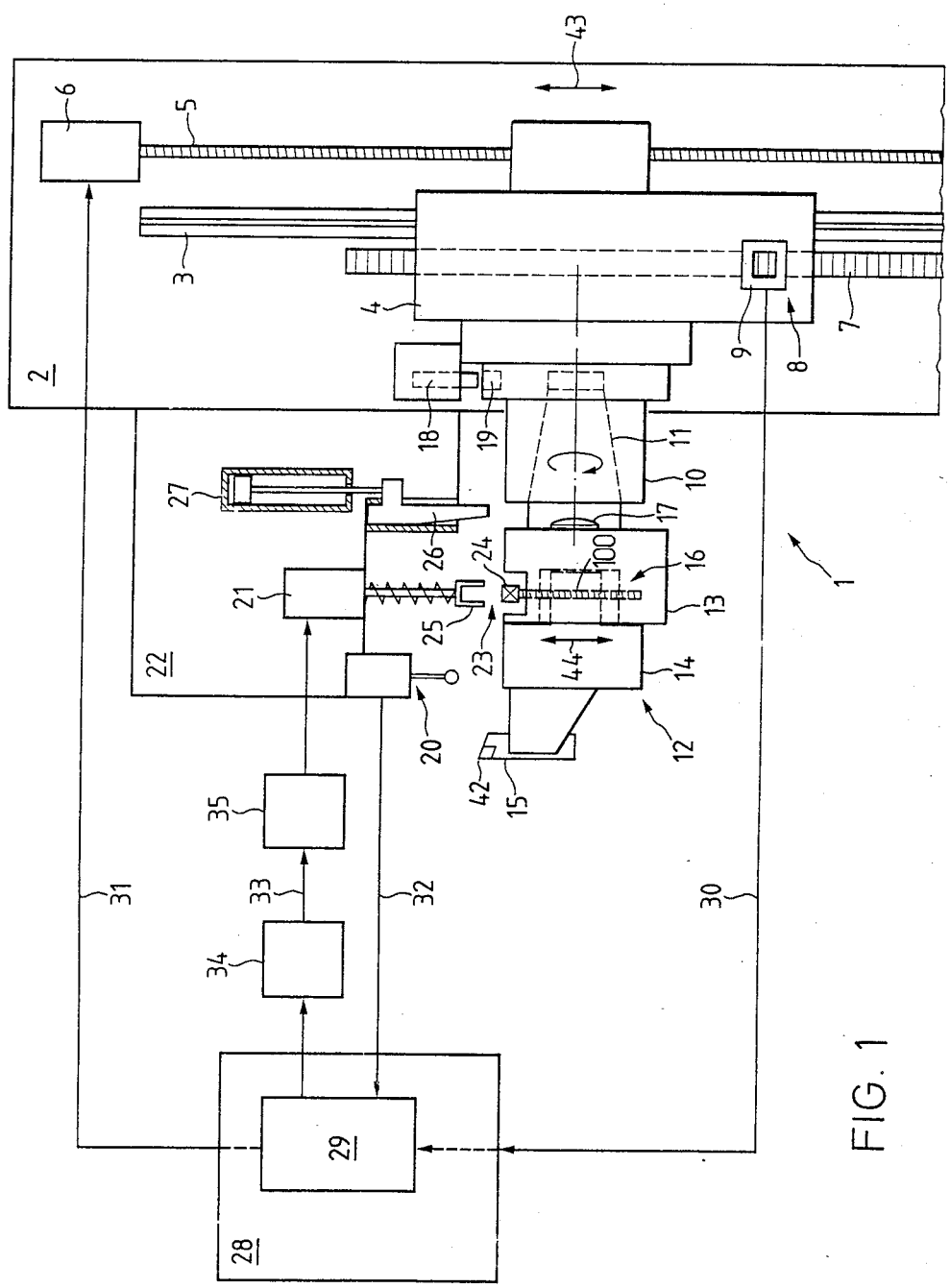
FIG. 1 is a schematic illustration of the apparatus constructed according to the invention with the drive means for the cross-feed slide in an inactive position or state.

Describing now the drawings, it is to be understood that only enough of the construction of the apparatus has been illustrated as needed for those skilled in the art to readily understand the underlying principles and concepts of the present development, while simplifying the showing of the drawings. Turning attention now specifically to FIG. 1, there has been schematically illustrated therein part of a cutting machine 1. In the illustrated example such cutting machine is a boring and milling machine, of which a part of a stand 2 thereof is evident. The stand 2 or the like contains a guiding or guide member 3 for guiding a carriage 4 arranged for reciprocatory movement along the guiding member 3 in a carriage displacement direction 43. Depending upon the nature of the cutting machine 1 the stand 2 is arranged for displacement in one or more directions parallel and/or normally with respect to the plane of the drawing in a manner which is known as such and, therefore, not here shown in further detail. The carriage 4 is in engagement with a displacement or adjustment spindle 5 which can be driven by a carriage drive means 6 for displacing the carriage 4. Mounted in parallelism to the guiding or guide member 3 and on the stand 2 is, for example, a scale 7 of a machine measuring system 8. In corresponding manner, a reading device 9 of the machine measuring system 8 is mounted on the carriage 4. Such a machine measuring system 8 is known as such and, for instance, commercially available under the trademark "INDUCTOSYN". This system, also, is part of a numerical control 28.

Furthermore, a rotatable and driven spindle 10 is provided at the carriage 4. This spindle 10 contains a tool holding and chucking fixture 11 known as such. A cross-feed head 12, also sometimes referred to in the art as a boring and facing head, is inserted into the spindle 10. The cross-feed head 12 comprises a spindle insert 13, and an adjustable cross-feed slide 14 provided with a suitable tool 15. The cross-feed slide 14 is displaceably arranged in the spindle insert 13 for displacement in a cross-feed displacement direction 44. The cross-feed head 12 includes a displacing or displacement mechanism 16 for displacement of the cross-feed slide 14, which mechanism 16, for example, may consist of a spindle gearing or gear means. The cross-feed head 12 can be optionally provided with clamping means, generally indicated by reference character 100, for the cross-feed slide 14. One such possible design of clamping means 100 has been disclosed in detail in the aforementioned copending U.S. patent application Ser. No. 06/488,534, the disclosure of which is incorporated herein by reference. The clamping means is therefore not here shown in any great detail, but it may be released by pressing upon a pin or bolt 17 or equivalent structure. Furthermore, the spindle 10 is equipped with indexing means which are known as such and, therefore, likewise not here shown in any great detail. An indexing pin or bolt 18 displaceably journaled at the carriage 4 engages a groove or recess 19 provided at the spindle 10 in an indexed position thereof, so that the spindle 10 is retained in this indexed position.

Figure 2:
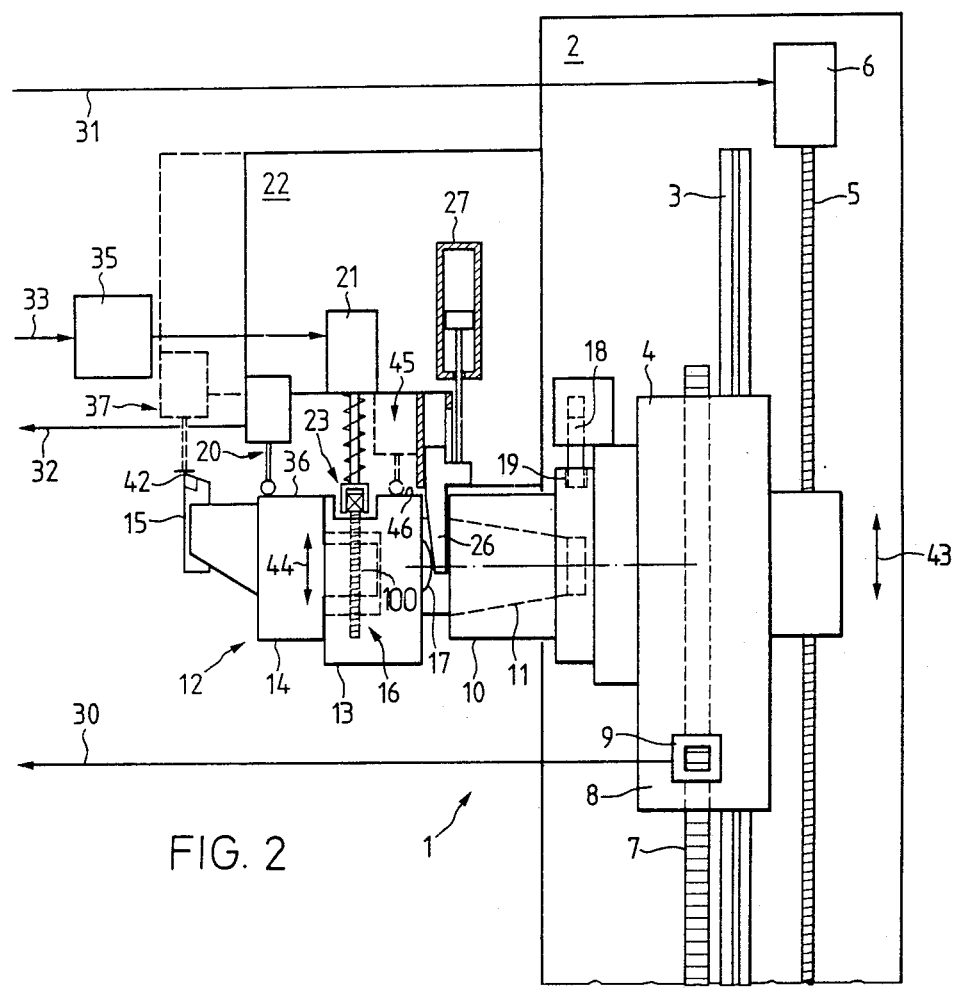
FIG. 2 depicts part of the apparatus shown in FIG. 1 with the drive means for the cross-feed slide in its active state or position.

In the position shown in FIG. 1 the carriage 4 is located in the end or terminal region of the carriage displacement path which is predetermined by the guiding member 3. At the end of the carriage displacement path a feeler or sensor 20 as well as displacing or displacement drive means 21 for the displacing or displacement mechanism 16 are fixedly arranged at a bracket or cantilever structure 22. A clutch 23 is provided between the displacement drive means 21 and the displacement mechanism 16 and comprises, for example, a square or four-cornered portion or member 24 defining a male member and a telescopable fork 25 defining a female member. In case that the insert of the cross-feed head 12 is provided with clamping means for the cross-feed slide 14, then the bracket 22 is further provided with an extendable wedge member or wedge fork 26. In the extended position thereof, as shown in FIG. 2, the wedge member or fork 26 presses upon the bolt 17, whereby the clamping of the cross-feed slide 14 is released and the cross-feed slide 14 can be readily displaced or positionally adjusted. The wedge member or fork 26, for example, may be displaced by means of a suitable hydraulic cylinder 27.

A numerical control (CNC) 28 is provided in a manner known as such for controlling the cutting machine 1. As a part thereof which is either installed therein or connected thereto there is provided an adjusting control or adjustment cycle mechanism 29. Such an adjusting or adjustment control 29 is realizable using a parameter-input sub-routine, like, for example, a freely programmable user control (CPC) commercially available from BOSCH, designation "MIKRO 8". The adjusting control 29 is connected via lines 30, 31 and 32 to the machine measuring system 8, to the carriage drive means 6 and to the feeler or sensor 20, respectively. A further line 33 connects the adjusting control 29 with the displacement drive means 21. In case that the displacement drive means 21 is formed by a stepping motor, a ramp generator 34 and an amplifier 35 are additonally connected into the line 33.

FIG. 2 shows the cutting machine 1 illustrated in FIG. 1. In the illustration of FIG. 2 the carriage 4 is shown approximately in its end or terminal position. It will be recognized that the sensor 20, for example, contacts a reference surface or face 36 at the cross-feed slide 14. Also, the clutch 23 is shown in the engaged state and the wedge member or fork 26 will be seen to actuate the bolt 17.

As shown in broken lines in FIG. 2 it is also possible to arrange a feeler or sensor 37 so as to be aligned with the tip 42 of the tool 15. The sensors 20 and 37 preferably are sensors indicating a null or zero-position, i.e. sensors or feelers which deliver an error signal in the case of deviations from the zero-position.

It is additionally possible to provide a further sensor 45 in conjunction with the sensor 20 or the sensor 37, the further sensor 45 being aligned with a reference surface or face 46 provided at the spindle insert 13. In such case, however, the further sensor 45 will have to be designed as a distance or displacement path measuring device, i.e. as a sensor which delivers a signal which is proportional to the deflection of the further sensor 45 by the reference surface or face 46. It is also possible to exchange the sensor 20 or 37 with the further sensor 45, so that the displacement path measuring device is aligned with the cross-feed slide 14. The further sensor 45 is connected to the adjusting or adjustment control 29 via a not particularly shown line. A sensor arrangement will be evident from the illustration of FIG. 3 in which a straight edge 38 is arranged forwardly of the sensor 20. The straight edge 38 is mounted at two pivotable levers 39 at two articulation or hinge points 40 and the levers 39 are mounted to the bracket 22 at two articulation or hinge points 41, whereby a four-bar linkage is formed.

MODE OF OPERATION

It is assumed that the tool 15, for example, in this case a turning or cutting tool is intended to be adjusted or set such that the cutting edge thereof is located on a larger diameter. For this purpose the carriage 4 including the spindle 10 is driven out of the here not further illustrated operating region of the cutting machine 1 and displaced to that end of the carriage displacement travel path or displacement path which contains the sensor 20 and the displacement drive means 21. During such movement the spindle 10 is moved into the indexed position thereof, so that the indexing pin or bolt 18 can engage with the groove or recess 19. The tip 42 of the tool 15 is, then, located in its outermost position facing the feeler or sensor 20. The cross-feed displacement direction 44 of the cross-feed head 12 is thus parallel to the carriage displacement direction 43.

At first the carriage 4 arrives at a pre-position where the clutch 23 has to be engaged. Since it is not certain, however, that the square or four-cornered portion 24 and the fork 25 are oriented towards each other in such a way that they may interengage, the fork 25 is designed to be telescopic. Should the clutch 23 still be not engaged, it will engage in the aforementioned pre-position when the displacement drive means 21 has slightly rotated the fork 25 through a small angle. Thus, the clutch 23 will be engaged at any rate in the pre-position of the carriage 4 when the displacement drive means 21 is activated. In case that the cross-feed head 12 is equipped with clamping means for the cross-feed slide 14 by means of which the cross-feed slide 14 is fixedly anchored to the spindle insert 13, then the clamping means for the cross-feed slide 14 will have to be released when the carriage 4 arrives at the pre-position. This is achieved, for example, by means of the hydraulic cylinder 27 which lowers the wedge member or fork 26, so that the wedge member or fork 26 displaces the pin or bolt 17 at the spindle insert 13 as previously explained.

The carriage 4 is not stopped in the pre-position. The pre-position thus is merely that position of the carriage 4 in which the clutch 23 and the wedge member or fork 26 have been activated.

Therefore, the carriage 4 continues to slowly move in the same direction until the carriage 4 arrives at a reference position. The location of the reference position has been previously determined by means of the numerical or numeric control 28 due to the job or task entered into the numerical control 28.

If the job, for example, is to displace the tool or the reference surface 36 at the cross-feed slide 14 to a desired radius R which is greater than the prior adjusted radius $R_A$ then the following actions will ensue:

Due to the prior adjusted or set radius $R_A$ the position of the carriage 4 at which no error signal is supplied by the sensor 20 when the same contacts the reference surface 36, i.e. the so-called zero-position of the sensor 20, is known to the numerical control 28. By means of the numerical control 28 there is now determined the new reference position of the carriage 4 at which the sensor 20 arrives at its zero-position upon contacting the reference surface or face 36. The new or revised reference position is displaced outwardly from the reference position of the carriage 4 corresponding to the radius $R_A$ by a distance $R - R_A$.

When the carriage 4 arrives at the reference position corresponding to the radius R and predetermined by the numerical control 28 the carriage 4 will remain at this position. In this position the reference surface or face 36 does not yet contact the sensor 20 since the reference surface 36 is still adjusted to the radius $R_A$. Thus, the feeler or sensor 20 will supply an error signal via the line 32 to the adjusting control 29. The adjusting control 29 supplies the displacement drive means 21 via line 33 with a control command for displacement in the displacement direction 44, so that the displacement mechanism 16 outwardly displaces the cross-feed slide 14. When the sensor 20 has arrived at the zero-position no error signal is delivered by it any longer and the displacement drive means 21 is switched or turned-off.

A known input station may be directly connected to the numerical control 28 or forms a part thereof; when the instruction for the numerical control 28, for example, is to reduce the radius R of the tool to the radius $R_1$, then the following operations will ensue:

The carriage 4 including the spindle 10 travels out of the working region and approaches the sensor 20 or 37 and the displacement drive means 21. During this displacement the position of the carriage 4 is continuously monitored by the reading device 9 of the machine measuring system 8 and transmitted via line 30 to the numerical control 28. When the carriage 4 arrives at the pre-position, the clutch 23 is engaged and the wedge member or fork 26 is lowered in the event that the cross-feed head 12 contains clamping means for the cross-feed slide 14.

Meanwhile the numerical control 28 also has determined at which reference position the carriage 4 is to be stopped. This reference position is reset or set back by an amount of displacement $R - R_1$ relative to the prior reference position of the carriage 4 associated with the radius R. When the carriage 4 arrives at the new or revised reference position the sensor 20 or 37 is already contacted and transmits an error signal to the adjusting control 21 via line 32. The adjusting or adjustment control 29 activates the displacement drive means 21 via line 33, so that the cross-feed slide 14 is displaced in the cross-feed displacement direction 44 and is distanced or spaced from the sensor 20 or 37 until no error signal is supplied thereby any longer to the adjusting control 29. This is valid for the case that the sensor 20 or 37 is displaceable over a sufficient distance to accommodate the largest possible amount of displacement $R_A - R_1$ of the cross-feed slide 14. In case that the sensor 20 or 37 performs only a very small stroke or travel about the zero-position thereof, then the adjusting control 29 will have to be programmed such that, when the sensor 20 or 37 supplies an error signal, the carriage drive means 6 is turned-off until the cross-feed slide 14 has been displaced by the displacement drive means 21, which has been activated in the meantime, in the correct direction to such an extent that the sensor 20 or 37 supplies a null or zero signal. Since, however, the carriage 4 has not yet arrived at the reference position the carriage drive means 6 is re-activated until it is again turned-off due to an error signal from the sensor 20 or 37. Thus, an alternating displacement of the cross-feed slide 14 and the carriage 4 is realized until the reference position of the carriage is reached and the sensor 20 or 37 supplies a zero signal.

When the cross-feed slide 14 is adjusted or set at the desired radius, then the carriage 4 is again moved away from the sensor 20 or 37. Upon exceeding the pre-position the clutch 23 is disengaged and the wedge member or fork 26, if present, is withdrawn or retracted, so that the cross-feed slide 14 is clamped in the new or revised radial position by the cross-feed slide clamping means.

In case there is provided an arrangement of two feelers or sensors 20 and 45 as shown in FIG. 2 there is dispensed with the coaction of the machine measuring system 8 to determine the reference position of the carriage 4. Since one sensor as, for example, sensor 20, supplies a zero signal and the other sensor, as, for example, the sensor 45, supplies a displacement path or position signal the desired displacement of the cross-feed slide 14 will have to correspond to the displacement path or position signal of the sensor 45 when the sensor 20 simultaneously supplies a zero signal. The carriage 4, or, respectively, the carriage drive means 6 and the displacement drive means 21 are controlled by the adjusting or adjustment control 29 in such a manner that the sensors 20 and 45 supply the aforementioned desired signals, whereby the adjustment is ended. By means of such arrangement further sources of error which affect the precision of the cutting machine 1 can be avoided. This relates to bending of the spindle 10, inaccuracies in the machine measuring system 8, thermal expansions and so forth.

Figure 3:
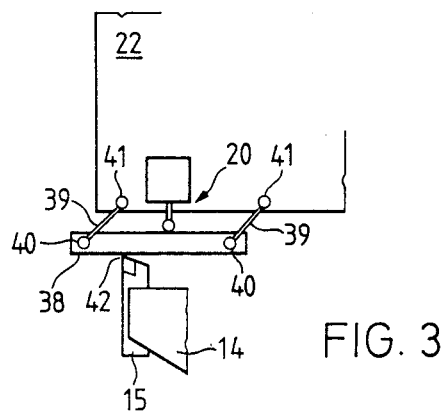
FIG. 3 shows a detail of the sensor arrangement of the apparatus depicted in FIG. 1.

In case it is intended to employ cross-feed heads 12 which have different working ranges a straight edge 38 may be arranged forwardly of the sensor 20 or 37, as will be evident from the showing of FIG. 3.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A cutting machine, especially a boring and milling machine, comprising:
    a stand including a guide member;
    a carriage arranged for reciprocating movement along said guide member in a carriage displacement path;
    drive means for displacing said carriage on said stand and including a displacement spindle and a drive motor;
    a machine measurement system mounted on said carriage and including a scale mounted substantially parallel to said guide member for measuring the position of said carriage;
    a spindle having an axis of rotation arranged at said carriage at substantially right angles to said guide member and including a tool holding and chucking fixture;
    said spindle having a groove identifying an indexed position thereof;
    a cross-feed head inserted into said spindle and including:
        a spindle insert;
        a cross-feed slide displaceably arranged in said spindle insert and provided with a tool having a top;
        a displacement mechanism for displacing said cross-feed slide relative to said spindle insert and comprising a spindle drive;
    a cantilever structure;
    a displacement drive means arranged at said cantilever structure at the end of said carriage displacement path for driving said displacement mechanism;
    a clutch arrangement provided between said displacement drive means and said displacement mechanism and comprising a male member and a female member engaging therewith to transmit rotary action, one of which members is advanceable;
    an indexing pin displaceably journalled at said carriage for engaging said groove provided at said spindle in said indexed position thereof such that said spindle is retained in said indexed position;
    a sensor for sensing the position of said cross-feed slide;
    a numerical control provided with an adjusting control mechanism for controlling said drive motor and said displacement drive means and connected with said sensor and with said machine measurement system;
    said numerical control being provided for adjusting a cutting radius defined by a distance between said axis of rotation of said spindle and said tip of said tool;
    clamping means provided in said cross-feed head for clamping said cross-feed slide in a defined position in relation to said spindle insert; and
    releasing means provided on said cantilever structure at one end of said carriage displacement path for releasing said clamping means.

2. The cutting machine as defined in claim 1, wherein:
    said cross-feed slide possesses a reference surface; and
    said sensor being aligned with said reference surface.

3. The cutting machine as defined in claim 1, wherein:
    said tool comprises a cutting tool; and
    said sensor being aligned with said tip of said tool.

4. The cutting machine as defined in claim 1, wherein:
    said sensor comprises a zero indicator.

5. The cutting machine as defined in claim 1, wherein:
    said releasing means comprising an advanceable wedge fork.

6. An apparatus for automatically adjusting the operating radius of an adjustable boring and facing head in a metal-cutting machine-tool, comprising:
    a rotatable and driven spindle having an axis of rotation for supporting and driving said boring and facing head;
    a carriage translatable at least in a carriage displacement direction substantially transverse to said spindle for supporting said spindle;
    said boring and facing head including a spindle insert, a cross-feed slide and a displacement mechanism for displacing said cross-feed slide relative to said spindle insert in a cross-feed displacement direction substantially transverse to said spindle;
    said cross-feed slide adjustably defining said operating radius relative to said axis of rotation;
    displacement drive means engaging and driving said displacement mechanism;
    a sensor for sensing a radial position of said cross-feed slide;
    support means supporting said displacement drive means and said sensor;
    a machine stand supporting said support means and said carriage;
    indexing means fixing said spindle such that said cross-feed displacement direction extends substantially parallel to said carriage displacement direction;
    carriage drive means effecting relative translation between said carriage and said support means in a direction substantially transverse to said spindle such that when said indexing means is effective said displacement drive means engages said displacement mechanism and said sensor senses said radial position of said cross-feed slide;
    a numerical control device cooperating with said sensor and controlling said displacement drive means and said carriage drive means to alter said operating radius;
    clamping means provided in said cross-feed head for clamping said cross-feed slide in a defined position in relation to said spindle insert; and releasing means provided on said support means at one end of said carriage displacement path for releasing said clamping means.

7. The apparatus as defined in claim 6, wherein:

said cross-feed slide possesses a reference surface; and said sensor being aligned with said reference surface.

8. The apparatus as defined in claim 6, further including:

a cutting tool having a top mounted at said cross-feed slide; and said sensor being aligned with said tip of said cutting tool.

9. The apparatus as defined in claim 8, further including:

a sensing bar;

two equal-length links pivotably journalled at said support means for forming a prallelogram linkage with said sensing bar; and said parallelogram linkage maintaining said sensing bar substantially parallel to said spindle and between said sensor and said tool tip also when said sensor is out of alignment with said tip of said cutting tool.

10. The apparatus as defined in claim 6, wherein:

said sensor is structured as a zero indicator.

11. The apparatus as defined in claim 6, further including:

a further sensor being aligned with said further reference surface; and said further sensor forming a member of a displacement measuring system.

12. The apparatus as defined in claim 6, wherein:

said releasing means comprises an extendable wedge fork.

* * * * *